(12) United States Patent
Mochizuki

(10) Patent No.: US 6,386,720 B1
(45) Date of Patent: *May 14, 2002

(54) LIGHT SOURCE DEVICE AND OPTICAL APPARATUS

(75) Inventor: Noritaka Mochizuki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,097

(22) Filed: Jul. 30, 1996

(30) Foreign Application Priority Data

Aug. 1, 1995 (JP) .............................. 7-215292

(51) Int. Cl.$^7$ .............................. G01D 11/28
(52) U.S. Cl. .................. 362/27; 362/31; 362/800; 385/146; 349/65
(58) Field of Search .............................. 362/26, 27, 31, 362/552, 231, 800, 97; 385/146; 349/65

(56) References Cited

U.S. PATENT DOCUMENTS

| | | | |
|---|---|---|---|
| 2,347,665 A | * 5/1944 | Christensen et al. | 362/97 |
| 4,128,332 A | 12/1978 | Rowe | 355/67 |
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata | 346/1.1 |
| 4,558,333 A | 12/1985 | Sugitani et al. | 346/140 R |
| 4,704,004 A | 11/1987 | Nosker | 350/345 |
| 4,723,129 A | 2/1988 | Endo et al. | 346/1.1 |
| 4,737,896 A | 4/1988 | Mochizuki et al. | 362/301 |
| 4,740,796 A | 4/1988 | Endo et al. | 346/1.1 |
| 4,766,498 A | 8/1988 | Spruit | 358/237 |
| 4,797,711 A | 1/1989 | Sasada et al. | 355/32 |
| 4,822,144 A | 4/1989 | Vriens | 350/339 |
| 4,870,484 A | 9/1989 | Sonehara | 358/59 |
| 4,882,617 A | 11/1989 | Vriens | 358/60 |
| 4,908,717 A | 3/1990 | Natori | 358/474 |
| 4,933,817 A | 6/1990 | Mochizuki et al. | 362/33 |

(List continued on next page.)

FOREIGN PATENT DOCUMENTS

| | | |
|---|---|---|
| EP | 0021093 | 1/1981 |
| EP | 0410703 | 1/1991 |
| EP | 0460659 | 12/1991 |
| EP | 0485975 | 5/1992 |
| EP | 0504998 | 9/1992 |
| JP | 59-123670 | 7/1984 |
| JP | 59-134975 | 8/1984 |
| JP | 59-138461 | 8/1984 |
| JP | 63-317351 | 12/1988 |
| JP | 2-102058 | 4/1990 |
| JP | 3-017644 | 1/1991 |
| JP | 3-193366 | 8/1991 |
| JP | 3-253179 | 11/1991 |
| JP | 5-208504 | 8/1993 |
| JP | 5-224019 | 9/1993 |
| WO | 90/02971 | 3/1990 |

OTHER PUBLICATIONS

Max Born et al., "Electromagnetic Theory of Propagation, Interference and Diffraction of Light", Principles of Optics, 1970, p. 285.

*Primary Examiner*—Stephen Husar
(74) *Attorney, Agent, or Firm*—Fitzpatrick, Cella, Harper & Scinto

(57) ABSTRACT

This specification discloses a light source device comprising a group of light emitting elements and adjusting means for individually adjusting the luminance of each light emitting element in the group of light emitting elements. The specification also discloses an optical device using such light source device to illuminate an object to be illuminated.

10 Claims, 6 Drawing Sheets

U.S. PATENT DOCUMENTS

| | | | |
|---|---|---|---|
| 4,976,514 A | 12/1990 | Murata et al. | 350/345 |
| 5,058,997 A | 10/1991 | Dickerson et al. | 359/59 |
| 5,068,568 A | 11/1991 | de Vrieze et al. | 313/474 |
| 5,128,842 A * | 7/1992 | Kenmochi | 362/31 X |
| 5,135,300 A | 8/1992 | Toide et al. | 353/31 |
| 5,214,536 A | 5/1993 | Prakash | 359/633 |
| 5,215,370 A | 6/1993 | Kaplan | 362/296 |
| 5,241,459 A | 8/1993 | Kaplan et al. | 362/298 |
| 5,248,518 A | 9/1993 | Toide et al. | 427/64 |
| 5,248,917 A | 9/1993 | Hamagishi et al. | 315/169.1 |
| 5,296,951 A | 3/1994 | Fox | 359/48 |
| 5,315,418 A | 5/1994 | Sprague et al. | 359/41 |
| 5,375,043 A * | 12/1994 | Tokunaga | 362/31 |
| 5,499,112 A | 3/1996 | Kawai et al. | 358/475 |
| 5,575,549 A * | 11/1996 | Ishikawa et al. | 362/31 |
| 5,584,556 A * | 12/1996 | Yokoyama et al. | 362/31 |
| 5,613,751 A * | 3/1997 | Parker et al. | 362/31 |
| 5,640,483 A * | 6/1997 | Lin | 385/146 |
| 5,808,295 A | 9/1998 | Takeda et al. | 250/216 |

\* cited by examiner

LIGHT SOURCE DEVICE AND OPTICAL APPARATUS

BACKGROUND OF THE INVENTION

1. Field of the Invention

This invention relates to a light source device and an optical apparatus, and particularly to a light source device forming a surface illuminant and an optical apparatus suitable when an object to be illuminated such as film or a liquid crystal panel is illuminated by a light beam from the surface illuminant.

2. Related Background Art

There have heretofore been proposed various light source devices in which a fluorescent lamp is provided parallel to a side of a transparent acrylic plate having its surface formed into a rough surface and rays of light from this fluorescent lamp are caused to enter the interior of the acrylic plate from the side and propagate through the interior and make the rough surface of the acrylic plate shine to thereby form a surface illuminant.

However, in the surface illuminant according to the conventional art, the luminance of the fluorescent lamp is higher at the center thereof than at the margin thereof and therefore, the luminance at the center is high and the luminance at the margin is low, and this has led to the problem that luminance irregularity occurs.

SUMMARY OF THE INVENTION

It is the object of the present invention to provide a light source device and an optical apparatus in which luminance distribution is controllable and accordingly this kind of luminance irregularity can be made small.

The light source device of the present invention is characterized by a group of light emitting elements and adjusting means for individually adjusting the luminance of each light emitting element in the group of light emitting elements and a transparent plate-like member in which a beam of light from the group of light emitting elements is caused to enter the interior of the plate-like member from a side of the plate-like member to thereby form a surface illuminant.

The invention has a form in which the light emitting elements are LEDs (light emitting diodes).

The invention has a form in which provision is made of a concave mirror for reflecting the light from the group of light emitting elements.

The invention has a form in which the light emitting elements in the group of light emitting elements are arranged in a certain direction and the concave mirror is provided with a cylindrical reflecting surface having a bus line in that direction.

The invention has a form in which the light emitting elements in the group of light emitting elements are arranged in a certain direction, and the concave mirror has a group of concave reflecting surfaces having a plurality of concave reflecting surfaces corresponding to one or more light emitting elements in the group of light emitting elements which are arranged along that direction.

The invention also has a form in which the concave mirror has a focus and the light emitting elements are placed at positions deviating from the focus and whereat rays of light from the light emitting elements are reflected by the concave mirror and become parallel rays of light.

The invention also has a form in which two concave mirrors are provided in a direction orthogonal to the direction in which the light emitting elements are arranged and a part of the rays of light from the light emitting elements is converted into parallel rays of light by one of the concave mirrors and is directed in a first direction, and another part of the rays of light from the light emitting elements is converted into parallel rays of light by the other concave mirror and is directed in a second direction differing from the first direction.

The invention also has a form in which the group of light emitting elements has a plurality of sets of light emitting portions which are provided with a light emitting element emitting red light, a light emitting element emitting green light and a light emitting element emitting blue light.

The invention also has a form in which the group of light emitting elements are provided correspondingly to the plurality of sides of the plate-like member.

The invention also has a form in which the group of light emitting elements are mounted on a side of the plate-like member.

The invention also has a form in which a scattering surface is formed on or near the surface of the plate-like member and the scattering surface shines.

The invention also has a form in which a scattering surface is formed on the bottom surface of the plate-like member.

The invention also has a form in which the scattering surface is designed such that the degree of scattering becomes greater away from the group of light emitting elements.

The invention also has a form in which the scattering surface has a number of cylindrical or pillar-like scattering portions and the height of the scattering portions becomes greater away from the group of light emitting elements.

The invention also has a form in which the scattering surface has a number of grating-like scattering portions and the area of the scattering portions becomes larger away from the group of light emitting elements.

The optical apparatus of the present invention is characterized in that it uses the light source device of the present invention or the light source device having any of the above-described forms to illuminate an object.

The invention also has a form in which the object to be illuminated is film and the image of the film illuminated is read.

The invention also has a form in which the object to be illuminated is a liquid crystal panel and the liquid crystal panel modulates illuminating light to form an image.

DETAILED DESCRIPTION OF THE PREFERRED EMBODIMENTS

Figure 1:
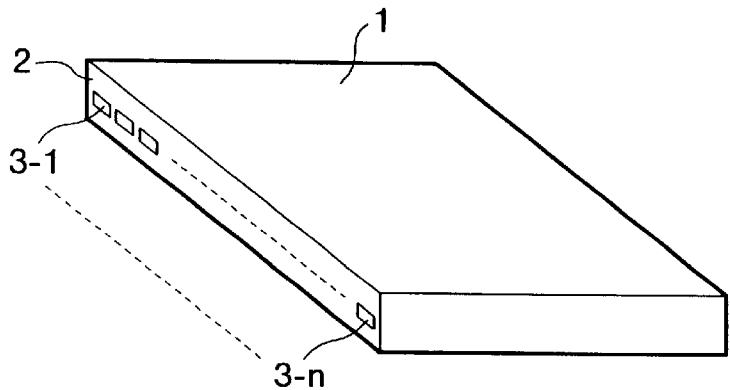
FIG. 1 is a schematic view showing the basic construction of the light source device of the present invention.

FIG. 1 is a schematic view showing the basic construction of the light source device of the present invention. In the light source device of FIG. 1, a plurality of light emitting diodes (hereinafter referred to as the "LEDs") 3-1 to 3-n which are light emitting elements are arranged and mounted on the end surface 2 of a transparent acrylic plate 1 of which the surface shape as it is seen from the front thereof is a square or a rectangle, along the lengthwise direction of the end surface 2. The surface of the acrylic plate 1 is a rough surface.

The LEDs in a light emitting element group (hereinafter referred to as the "LED group") comprising the plurality of LEDs are each driven by exclusive drive sources (adjusting means), and each of the drive sources can adjust the luminance of the LED corresponding thereto. Accordingly, the luminance of each LED can be individually adjusted and therefore, the luminance distribution of a linear light source comprising the LED group can be controlled. The luminance distribution of a surface illuminant can also be controlled when the beam of light from the LED group is caused to enter the interior of the acrylic plate from the end surface of the acrylic plate and make the surface of the acrylic plate shine to thereby provide a surface illuminant.

By constructing the LED group by repeating the arrangement of a red LED, a green LED and a blue LED a plurality of times, a white linear light source or surface illuminant can be formed. Of course, the LED group may be constructed of only LEDs of each color to thereby form a monochromatic linear light source or surface illuminant of red, green or blue.

Also, the LED group may be disposed in a slightly spaced apart relationship with the end surface 2 of the acrylic plate 1.

Also, a transparent plastic plate or a transparent glass plate may be used in lieu of the transparent acrylic plate.

Also, the surface which is a rough surface may be the bottom surface of a transparent acrylic plate.

Figure 2:
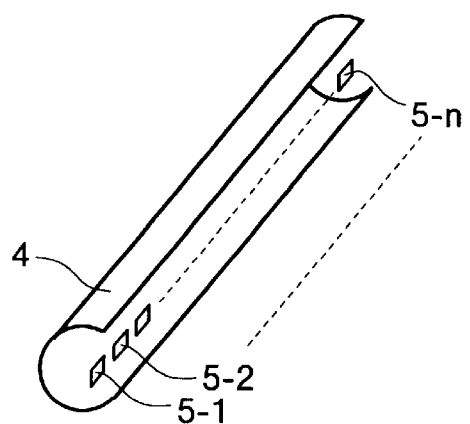
FIG. 2 is a schematic view showing Embodiment 2 of the light source device of the present invention.

FIG. 2 is a schematic view showing Embodiment 2 of the light source device of the present invention.

In FIG. 2, the reference numeral 4 designates a concave mirror having a cylindrical reflecting surface, and an LED group comprising a plurality of LEDs 5-1 to 5-n arranged in the direction of the bus line (the lengthwise direction) of the cylindrical reflecting surface are provided. This LED group, like the LED group of FIG. 1, is also designed such that the luminance of each LED therein can be individually adjusted. The concave mirror 4 reflects the beam of light from the LED group and forms a linear light source. The LED group is constructed by repeating the arrangement of a red LED, a green LED and a blue LED a plurality of times.

Figure 3:
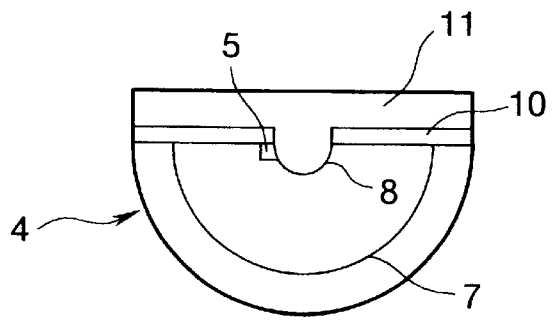
FIG. 3 is a cross-sectional view showing the specific construction of the device of FIG. 2.

FIG. 3 is a cross-sectional view of essential portions showing the specific construction of the light source device of FIG. 2.

In FIG. 3, the reference numeral 5 denotes an LED chip, and the reference numeral 7 designates a cylindrical reflecting surface of which the cross-sectional shape comprises a spherical surface, a parabolic surface, an elliptical surface or the like. The reference numeral 11 denotes the epoxy resin of an armor and the reference numerals 8 and 10 designate lead wires for connecting the LED chip 5 and a drive source, not shown, together and flowing an electric current to the LED chip 5. The luminance of the LED chip 5 can be changed by changing the magnitude of the electric current flowing thereto.

Figure 4:
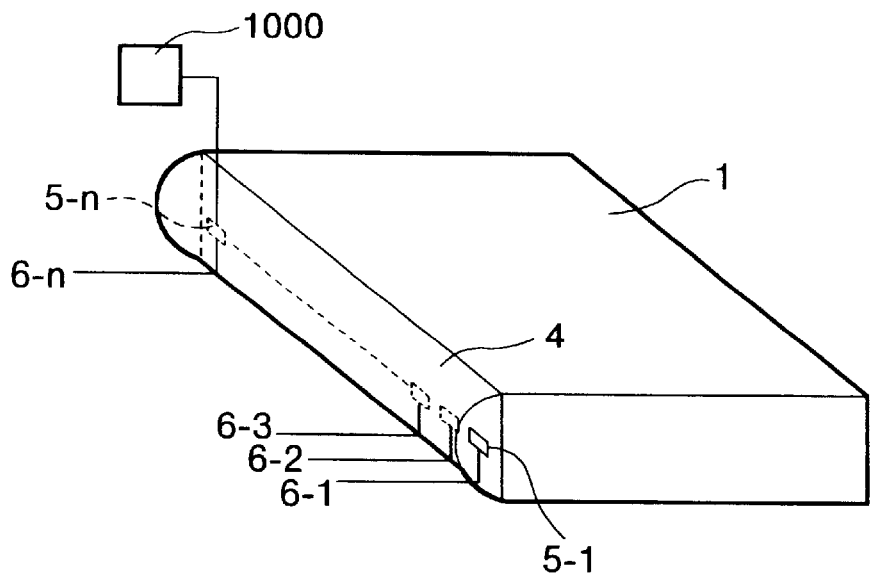
FIG. 4 is a schematic view showing Embodiment 3 of the light source device of the present invention.

FIG. 4 is a schematic view showing Embodiment 3 of the light source device of the present invention. The light source device of FIGS. 2 and 3 is provided on the end surface of the acrylic plate 1 to thereby form a surface illuminant as in the light source device of FIG. 1.

In FIG. 4, the reference numerals 6-1 to 6-n denote lead wires for flowing an electric current to LEDs 5-1 to 5-n, and the reference numeral 1000 designates a controller for individually adjusting the luminance of each LED in the LED group and controlling the luminance distribution. The construction of the acrylic plate 1 is such that a rough surface (diffusing surface) is formed on a surface thereof (the upper surface as viewed in FIG. 4) and a reflecting plate is provided on each of the three end surfaces other than the end surface of the acrylic plate 1 on which the LED group is provided and the bottom surface. In lieu of this reflecting plate, reflecting film may be formed on each surface.

Figure 5:
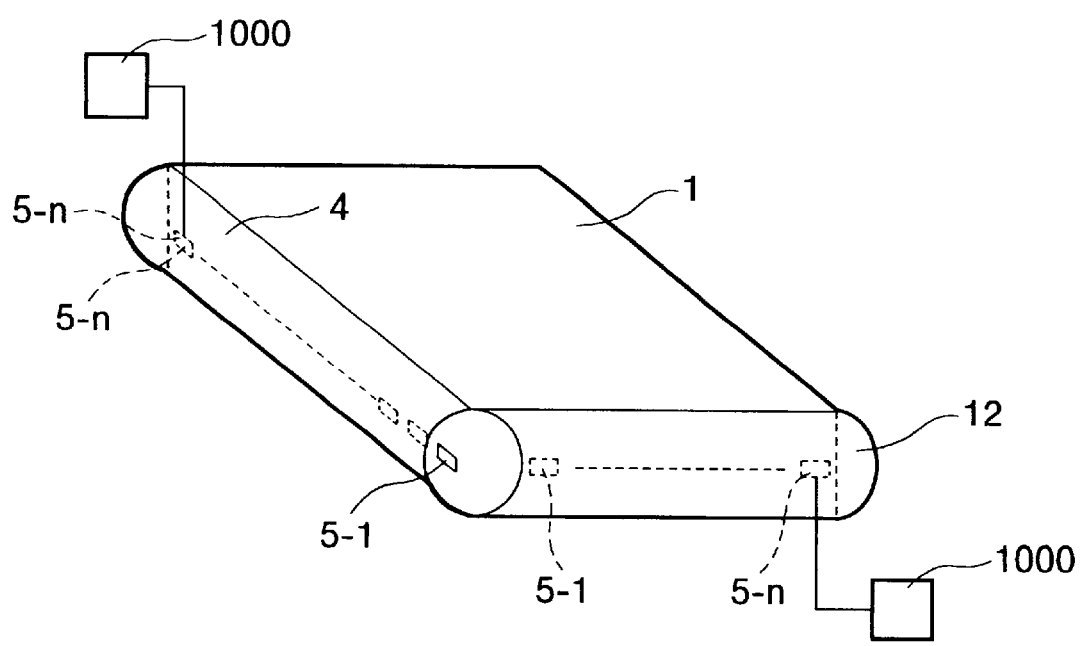
FIG. 5 is a schematic view showing Embodiment 4 of the light source device of the present invention.

FIG. 5 is a schematic view showing Embodiment 4 of the light source device of the present invention. This embodiment is one in which in the light source device of FIG. 4, the light source device shown in FIGS. 2 and 3 is also provided on another end surface of the acrylic plate 1. Also, the device shown in FIGS. 2 and 3 may be provided on all end surfaces of the acrylic plate 1.

Figure 6:
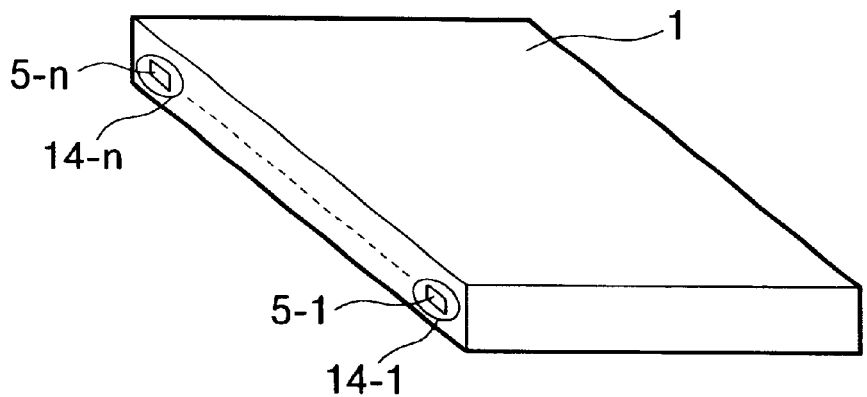
FIG. 6 is a schematic view showing Embodiment 5 of the light source device of the present invention.

FIG. 6 is a schematic view showing Embodiment 5 of the light source device of the present invention. This embodiment is one using, in lieu of the concave mirror having a cylindrical reflecting surface in the light source device of FIG. 4, a concave reflecting surface on which a plurality of rotation-symmetrical minute concave mirrors 14-1 to 14-n (a concave reflecting surface group) are arranged correspondingly to the respective LEDs in the LED group. The shape of the reflecting surfaces of the minute concave mirrors 14-1 to 14-n is a spherical surface, a parabolic surface, an elliptical surface or the like. Again in the form of FIG. 6, the LED group with a lens unit may be disposed on one, two three or all of the end surfaces of the acrylic plate 1 as shown in FIG. 5.

Figure 7:
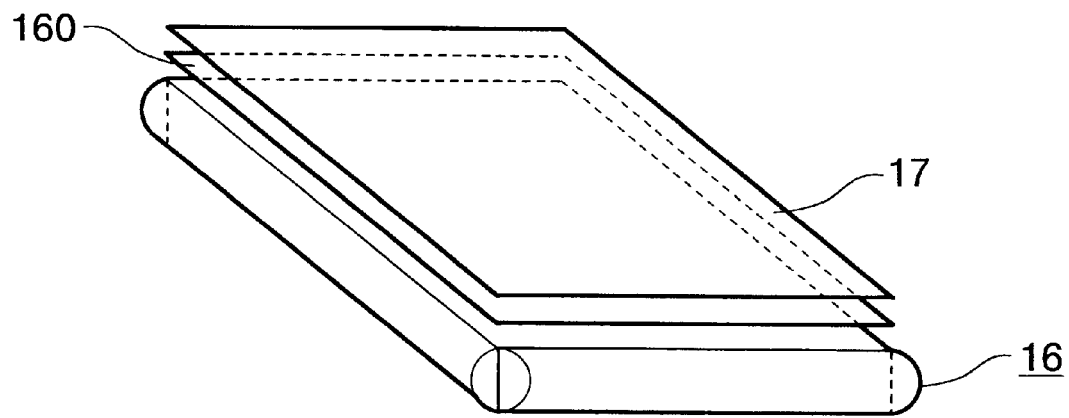
FIG. 7 is a schematic view showing an example of the optical apparatus of the present invention.

FIG. 7 is a schematic view showing an example of the optical apparatus of the present invention. In FIG. 7, the reference numeral 16 designates the light source device shown in FIGS. 2 to 6 or a light source device shown in FIGS. 8A to 11 which will be described later. The reference numeral 160 denotes a light scattering sheet, and the reference numeral 17 designates an object to be illuminated. The object 17 to be illuminated is a film or a liquid crystal panel, and the film is illuminated by the light source device 16 and the image thereon is read by a CCD, and the liquid crystal panel modulates the illuminating light from the light source device 16 and forms an image. In the present embodiment, the light source device 16 adjusts the luminance of each LED in the LED group by the controller 1000 (not shown) and substantially uniformizes the luminance distribution of the surface illuminant.

Figure 8A:
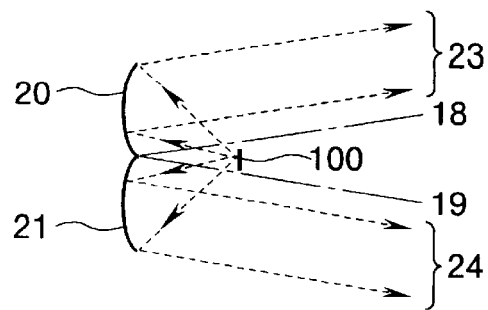
FIGS. 8A and 8B are schematic views showing Embodiment 6 of the light source device of the present invention.
Figure 8B:
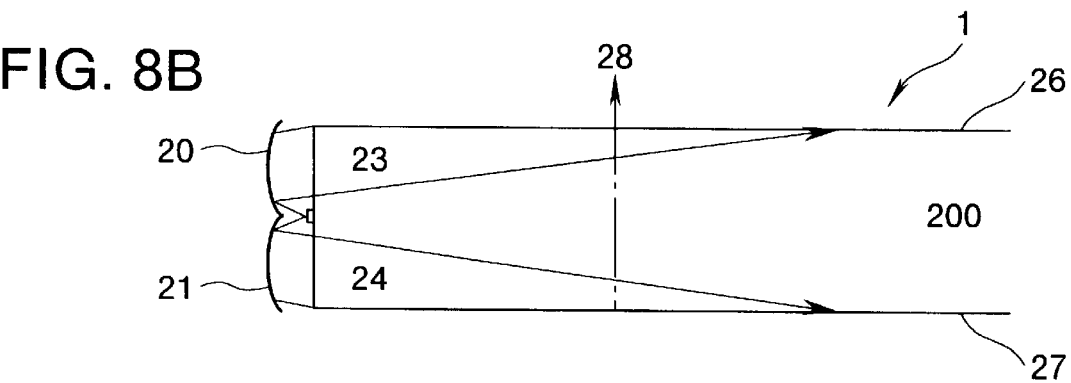

FIGS. 8A and 8B are schematic views showing Embodiment 6 of the optical apparatus of the present invention. This embodiment shows the preferred arrangement of the concave mirror and LEDs in each of the above-described embodiments. FIG. 8A is a plan view of the essential portions of the present embodiment, and FIG. 8B is a cross-sectional view of the essential portions thereof.

In FIGS. 8A and 8B, a reflecting mirror (a concave mirror) for reflecting rays of light from an LED 100 is provided with two first and second reflecting surfaces 20 and 21, and the LED 100 is placed at the middle point of a segment linking the focuses of the reflecting surfaces 20 and 21 together. At least one of the upper surface 26 and lower surface 22 of the acrylic plate 1 is a rough surface.

Accordingly, the LED 100 is eccentric relative to the focuses of the reflecting surfaces 20 and 21, and a part of the rays of light emitted from the LED 100 is reflected by the reflecting surface 20, is converted into parallel rays of light 23 and is directed upwardly obliquely, and another part of the rays of light emitted from the LED 100 is reflected by the reflecting surface 21, is converted into parallel rays of light 24 and is directed downwardly obliquely.

Since the LED 100 and the reflecting mirrors 20 and 21 are provided on the end surface of the acrylic plate 1, the parallel rays of light 23 and 24 pass through the interior of the acrylic plate 1, travel toward the upper surface 26 and lower surface 27, respectively, are scattered by at least one of the upper surface 26 and lower surface 27 and are emitted to right above and at the same time, propagate rightwardly in the acrylic plate 1.

According to the present embodiment, it is possible to cause the beam of light emitted from the LED group to efficiently propagate through the interior of the transparent plate for forming a surface illuminant.

Figure 9A:
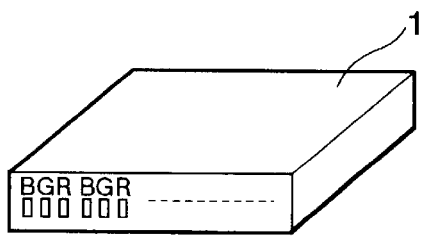
FIGS. 9A, 9B and 9C are schematic views showing Embodiments 7 to 9 of the light source device of the present invention.
Figure 9B:
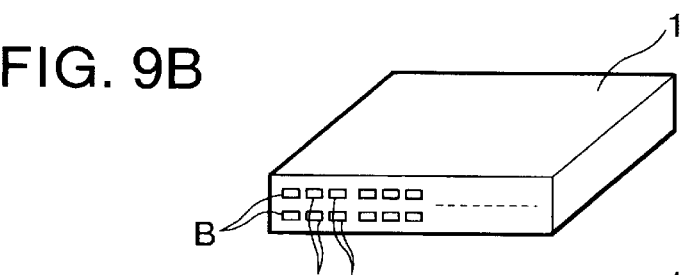
Figure 9C:
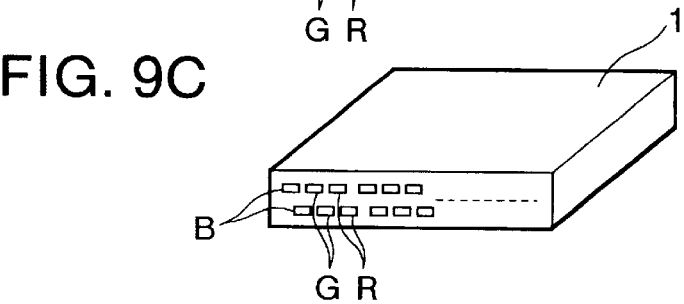

FIGS. 9A, 9B and 9C are schematic views showing Embodiments 7, 8 and 9, respectively, of the light source device of the present invention. FIGS. 9A, 9B and 9C show embodiments showing the forms of the arrangement of red LEDs, green LEDs and blue LEDs. The arrangements shown there are applicable to each of the above-described and following embodiments. In FIGS. 9A, 9B and 9C, the letters R, G and B designate red LEDs green LEDs and blue LEDs, respectively, provided on the end surface of the acrylic plate 1. FIG. 9A show an example in which a plurality of sets of blue LEDs, green LEDs and red LEDs are arranged in the lengthwise direction of the end surface, FIG. 9B shows an example in which the LED groups of FIG. 9A are arranged in two rows in the lengthwise direction of the end surface, and FIG. 9C shows an example in which the LED groups of FIG. 9A are arranged in two rows in the lengthwise direction of the end surface while being deviated by a half of the arrangement pitch of the LED groups.

Figure 10:
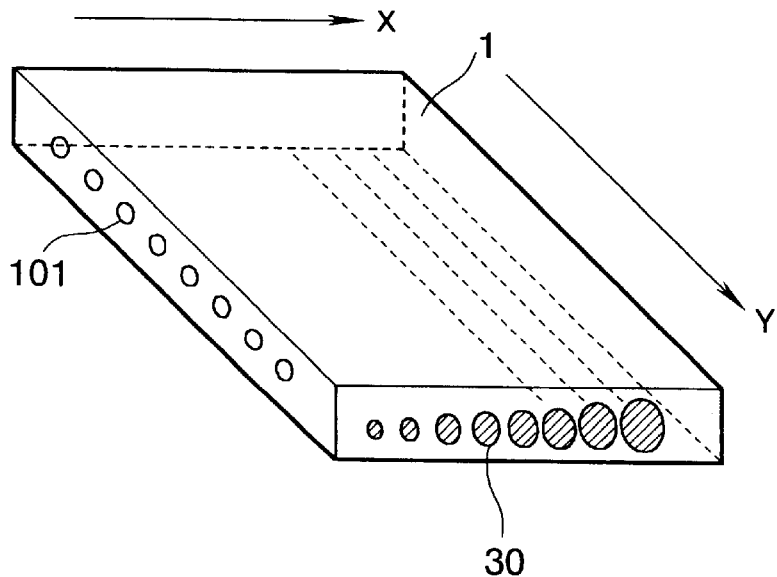
FIG. 10 is a schematic view showing Embodiment 10 of the light source device of the present invention.
Figure 11:
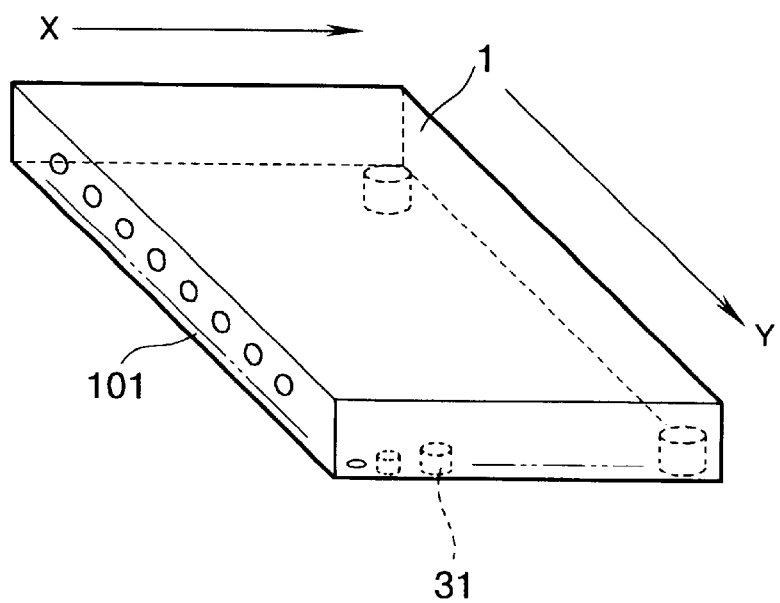
FIG. 11 is a schematic view showing Embodiment 11 of the light source device of the present invention.

FIGS. 10 and 11 are schematic views showing Embodiments 10 and 11, respectively, of the light source device of the present invention. FIGS. 10 and 11 show embodiments showing the forms of the rough surface (scattering surface) of the transparent plate for forming a plane light source (surface illuminant), and the constructions shown there are applicable to each of the above-described embodiments. In FIGS. 10 and 11, the reference numeral 1 designates an acrylic plate, the reference numeral 101 denotes an LED group, and the reference numerals 30 and 31 designate scattering portions. The scattering portions 30 comprise gratings, and the scattering portions 31 comprise cylinders or pillars, and both of these are patterned on the back of the acrylic plate 1 and are formed integrally with the acrylic plate with acryl as a material. In FIG. 10, the scattering portions 30 become larger in their area (equal in height) away from the LED group 101, while in FIG. 11, the scattering portions 31 comprising the whole of the surface of cylinders or pillars become greater in their height (equal in cross-sectional area) away from the LED group 101, and by so constructing, the degree of scattering by the scattering surface is made greater away from the light emitting element group, and the luminance irregularity with respect to X direction is made smaller. The luminance irregularity with respect to Y direction, as in the aforedescribed embodiments, is made small by individually adjusting the luminance of each LED in the LED group 101.

The light source device of the present invention can control luminance distribution and therefore can not only make luminance irregularity small, that is, make luminance distribution uniform, but also can form a desired luminance distribution (irregularity).

For example, when a surface to be illuminated is projected by a projection lens, marginal luminance is reduced due to the vignetting or the like of the projection lens. So, if a surface illuminant higher in luminance at the margin thereof than at the center thereof is formed by the light source device of the present invention and the surface to be illuminated is illuminated by this surface illuminant, good illumination can be accomplished.

As described above, there can be provided a light source device and an optical apparatus which can make luminance distribution good and moreover can control it easily.

Figure 12A:
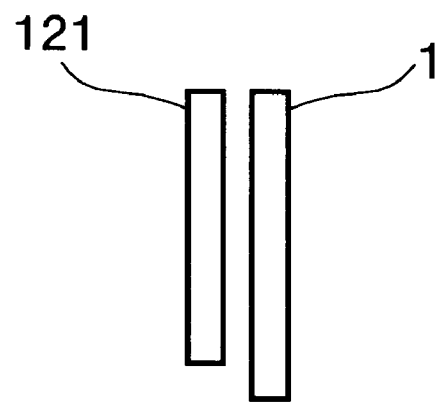
FIGS. 12A and 12B are an example of the optical apparatus of the present invention and FIG. 12A shows a liquid crystal display panel and FIG. 12B shows a film reading device.
Figure 12B:
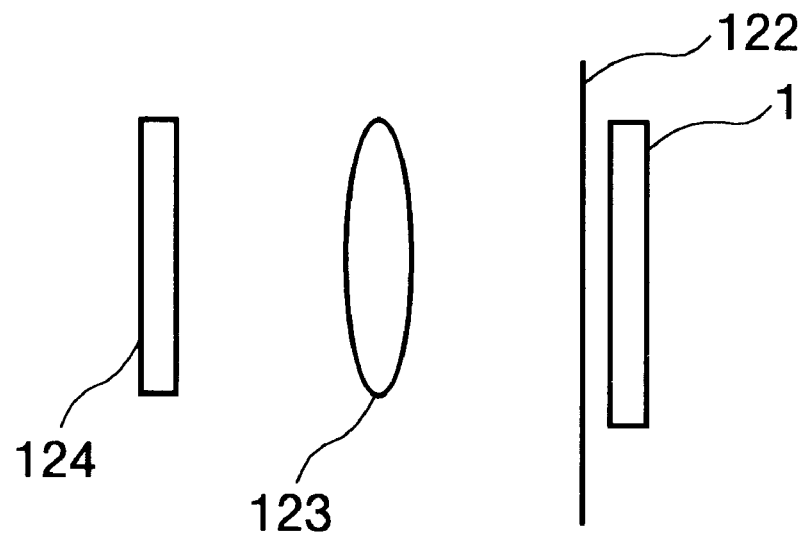

FIGS. 12A and 12B show an example of the optical apparatus of the present invention.

In FIG. 12A, the reference numeral 1 designates the surface illuminant device shown in each of the above-described embodiments, and the reference numeral 121 denotes a liquid crystal element. The liquid crystal element 121 is illuminated with the light from the device 1 having a uniform intensity distribution over the whole thereof and therefore, the entire screen thereof becomes bright.

In FIG. 12B, the reference numeral 1 designates the surface illuminant device shown in each of the above-described embodiments, the reference numeral 122 denotes film on which the image of a figure or landscape is recorded, the reference numeral 123 designates a projection lens for projecting the image on the film 122, and the reference numeral 124 denotes an image pickup device such as a CCD for receiving the image on the film 122 and converting it into a video signal. The film 122 is illuminated with the light from the device 1 having a uniform intensity distribution over the whole thereof and therefore, the entire film can be read by the CCD under substantially the same conditions.

What is claimed is:

1. A light source device comprising:
    a transparent plate-like member; and
    a plurality of light emitting elements arranged along a side surface of said transparent plate-like member,
    wherein light from said plurality of light emitting elements enters the interior of said transparent plate-like member from the side surface and emerges from a front surface of said transparent plate-like member, a plurality of grating-like portions are integrally formed on a back surface of said transparent plate-like member so as to cause light propagating in said transparent plate-like member to be scattered, said plurality of grating-like portions have the same height, the area of said grating-like portions becomes greater toward a direction away from the side surface of said transparent plate-like member.

2. The light source device of claim 1, wherein said light emitting elements are LEDs.

3. The light source device of claim 1, further comprising a concave mirror for reflecting the light from said plurality of light emitting elements.

4. The light source device of claim 3, wherein said plurality of light emitting elements are arranged in a particular direction and said concave mirror is provided with a cylindrical reflecting surface having a bus line in the particular direction.

5. The light source device of claim 3, wherein said plurality of light emitting elements are arranged in a particular direction, and said concave mirror has a group of concave reflecting surfaces having a plurality of concave reflecting surfaces corresponding to one or more light emitting elements of said plurality of light emitting elements which are arranged along the particular direction.

6. The light source device of claim 1, wherein said plurality of light emitting elements are provided correspondingly to a plurality of sides of said transparent plate-like member.

7. An optical element comprising:

a transparent plate-like member;

wherein light from a light source enters the interior of said transparent plate-like member from the side surface and emerges from a front surface of said transparent plate-like member, a plurality of grating-like portions are integrally formed on a back surface of said transparent plate-like member so as to cause light propagating in said transparent plate-like member to be scattered, said plurality of grating-like portions have the same height, the area of said grating-like portions becomes greater toward a direction away from the side surface of said transparent plate-like member.

8. A light source device comprising:

the optical element according to claim 7; and a light source which supplies the interior of the optical element with light.

9. An image forming apparatus in which a liquid crystal panel is illuminated by the light source device according to any one of claims 1 to 6 and 8.

10. An image reading apparatus in which a film for reading an image is illuminated by the light source device according to any one of claims 1 to 6 and 8.

* * * * *